(12) United States Patent
Margallo Balbás

(10) Patent No.: US 11,378,661 B2
(45) Date of Patent: Jul. 5, 2022

(54) METHOD FOR PROVIDING A SELF-ASSEMBLED EXTENDED FIELD OF VIEW RECEIVER FOR A LIDAR SYSTEM

(71) Applicant: Mouro Labs, S.L., Madrid (ES)

(72) Inventor: Eduardo Margallo Balbás, Tres Cantos (ES)

(73) Assignee: MOURO LABS, S.L., Madrid (ES)

( * ) Notice: Subject to any disclaimer, the term of this patent is extended or adjusted under 35 U.S.C. 154(b) by 0 days.

(21) Appl. No.: 17/608,253

(22) PCT Filed: Apr. 23, 2020

(86) PCT No.: PCT/EP2020/061329
§ 371 (c)(1),
(2) Date: Nov. 2, 2021

(87) PCT Pub. No.: WO2020/224976
PCT Pub. Date: Nov. 12, 2020

(65) Prior Publication Data
US 2022/0146636 A1 May 12, 2022

Related U.S. Application Data

(60) Provisional application No. 62/842,924, filed on May 3, 2019.

(51) Int. Cl.
*G01S 7/48* (2006.01)
*G01S 7/481* (2006.01)
*G01S 17/32* (2020.01)

(52) U.S. Cl.
CPC .......... *G01S 7/4816* (2013.01); *G01S 7/4813* (2013.01); *G01S 17/32* (2013.01)

(58) Field of Classification Search
None
See application file for complete search history.

(56) References Cited

U.S. PATENT DOCUMENTS 9,717,119 B2 7/2017 Rodinger et al.
2010/0308429 A1* 12/2010 Ma .................. H01L 31/105
257/458
2017/0350965 A1 12/2017 Schmalenberg

FOREIGN PATENT DOCUMENTS

AU 2002313996 A1 2/2004
CN 106872959 A 6/2017
WO 2020224976 A1 11/2020

OTHER PUBLICATIONS

International Search Report and Written Opinion received for PCT Application No. PCT/EP2020/061329. dated Jul. 13, 2020. 13 pages.

* cited by examiner

*Primary Examiner* — Hovhannes Baghdasaryan
(74) *Attorney, Agent, or Firm* — Finch & Maloney PLLC

(57) ABSTRACT

The method comprises fabricating a plurality of sub-units on a planar substrate, where each sub-unit comprises an optical sensing structure configured to receive at least a portion of an optical wavefront that impinges on one or more of the sub-units, and material forming at least a portion of a hinge in a vicinity of a border with at least one adjacent sub-unit; removing at least a portion of the substrate on respective borders between each of at least three different pairs of sub-units to enable relative movement between the sub-units in each pair constrained by one of the hinges formed from the material; and providing one or more actuators configured to apply a force to fold a connected network of multiple sub-units into a non-planar formation.

17 Claims, 7 Drawing Sheets

METHOD FOR PROVIDING A SELF-ASSEMBLED EXTENDED FIELD OF VIEW RECEIVER FOR A LIDAR SYSTEM

OBJECT OF THE INVENTION

This disclosure relates to providing a self-assembled extended field of view receiver for a LiDAR system.

BACKGROUND OF THE INVENTION

A variety of types of LiDAR systems use various kinds of optical elements for receiving light over a desired field of view (FOV). In some systems, focal plane arrays are used in an imaging configuration, where different parts of a field of view are imaged on different respective elements of the array. In some systems, elements may be manufactured on a convex substrate, but some manufacturing processes, such as manufacturing that requires hand assembly, may add excessive cost and complexity to the assembly process.

DESCRIPTION OF THE INVENTION

In one aspect, in general, a method comprises: fabricating a plurality of sub-units on a planar substrate, where each sub-unit comprises: an optical sensing structure configured to receive at least a portion of an optical wavefront that impinges on one or more of the sub-units, and material forming at least a portion of a hinge in a vicinity of a border with at least one adjacent sub-unit; removing at least a portion of the substrate on respective borders between each of at least three different pairs of sub-units to enable relative movement between the sub-units in each pair constrained by one of the hinges formed from the material; and providing one or more actuators configured to apply a force to fold a connected network of multiple sub-units into a non-planar formation.

Aspects can include one or more of the following features:

One or more of the actuators is configured to apply a magnetic force.

One or more of the actuators configured to apply a magnetic force comprise a ferromagnetic material.

One or more of the actuators configured to apply a magnetic force comprises a planar coil formed on a surface of a sub-unit.

The removing comprises removing at least a portion of the substrate on a border between each of at least eleven different pairs of sub-units.

The method further comprises fabricating at least one layer over the planar substrate that includes conducting material to provide electrical communication between at least one pair of adjacent sub-units.

The method further comprises fabricating at least one layer over the planar substrate that includes an optical waveguide to provide optical communication between at least one pair of adjacent sub-units.

The method further comprises attaching the sub-units to each other after the actuators fold the connected network of multiple sub-units into the non-planar formation.

The method further comprises placing a solid support body in proximity to at least one of the sub-units to confine movement of at least one of the multiple sub-units and to at least partially determine a geometry of the non-planar formation.

The solid support body has a remanent magnetization and interacts with the sub-units through its magnetic field.

The method further comprises attaching the sub-units to the support body.

In another aspect in general, an article of manufacture comprises: a plurality of sub-units fabricated on a planar substrate, where each sub-unit comprises: an optical sensing structure configured to receive at least a portion of an optical wavefront that impinges on one or more of the sub-units, and material forming at least a portion of a hinge in a vicinity of a border with at least one adjacent sub-unit; at least one gap along respective borders between each of at least three different pairs of sub-units to enable relative movement between the sub-units in each pair constrained by one of the hinges formed from the material; and one or more actuators configured to apply a force to fold a connected network of multiple sub-units into a non-planar formation.

Aspects can comprise one or more of the following features:

The article further includes at least one emitting module configured to provide an illumination optical wave illuminating at least a portion of a field of view.

The article further includes circuitry configured to determine distances associated with one or more portions of the field of view based on outputs of the optical sensing structures.

The non-planar formation is designed to combine the field of view of the optical sensing structures into an uninterrupted compound field of view.

At least one optical waveguide connecting the sub-units is used to provide a time, frequency or phase reference to enable distance determination.

At least one electrical conductor connecting the sub-units is used to provide a time, frequency or phase reference to enable distance determination.

Aspects can have one or more of the following advantages:

One advantage is the simplicity of the assembly process, which allows a larger number of individual sensors to be used, with a more granular subdivision of the field of view. A sufficiently high-density sampling of space may reduce or remove the need for mechanical scanning, as long as there are no blind regions between the individual FOVs. Conversely, a larger coverage can be attained for a given limited field of view per individual sensor.

DESCRIPTION OF THE DRAWINGS

To complement the description being made and in order to aid towards a better understanding of the characteristics of the invention, in accordance with a preferred example of practical embodiment thereof, a set of drawings is attached as an integral part of said description wherein, with illustrative and non-limiting character, the following has been represented.

PREFERRED EMBODIMENT OF THE INVENTION

Implementations of a light detection and ranging (LiDAR) system can include a self-assembled sensor providing an extended angular coverage. This self-assembled sensor may be achieved, for example, by compounding the individual fields of view of multiple individual sub-units to collectively form a composite field of view, where the sub-units are assembled into a designed three-dimensional (3D) structure out of a single flat substrate.

Self-assembly refers to any of a variety of features that may be included in or attached to the sub-units to enable or facilitate the relative movement of the sub-units such that they transition from an initial state (e.g., an initial flat state) to an assembled state, such as the designed 3D structure, in which the sensor will be used, as described in more detail below.

Figure 1A:
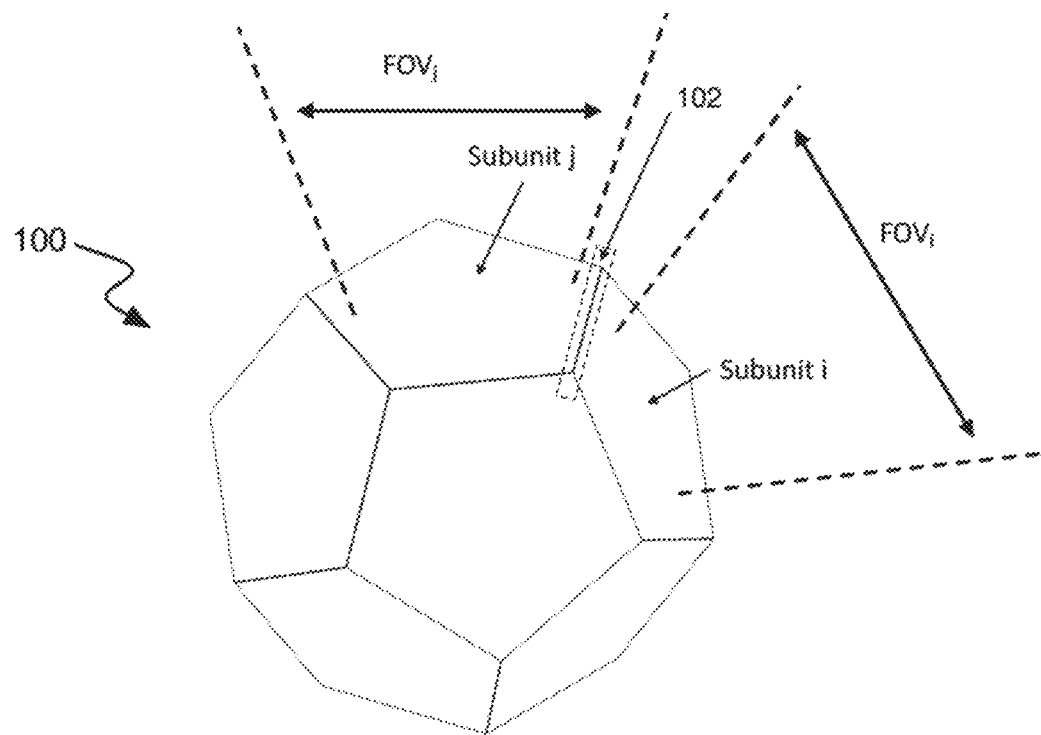
FIGS. 1A and 1B.—Show diagrams of a dodecahedron-shaped sensor showing an assembled view and a flat unfolded view, respectively.
Figure 1B:
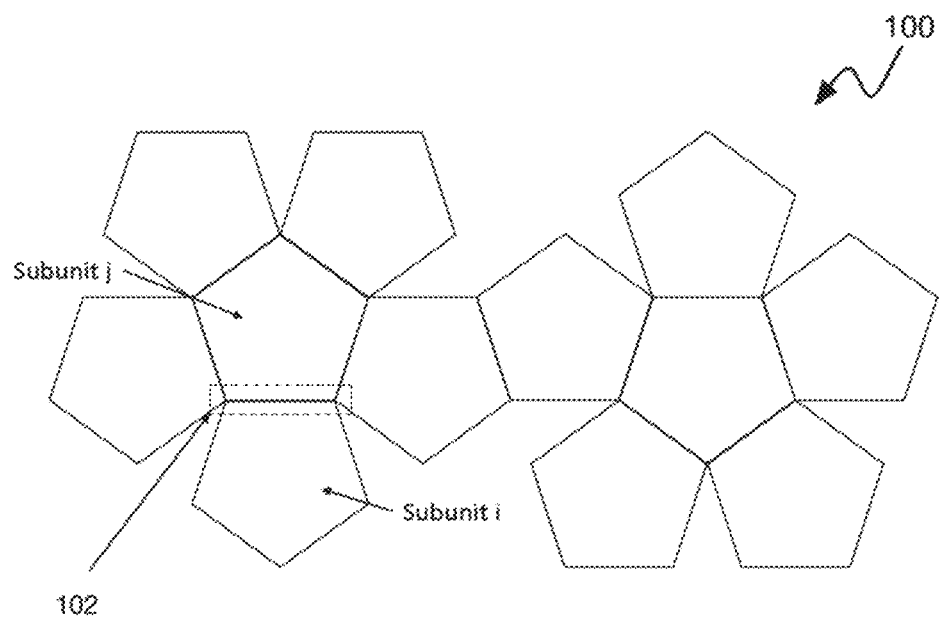

FIG. 1A shows an example dodecahedron-shaped sensor (100) in an assembled state. The entire sensor has a large composite field of view. Each sub-unit (e.g., Subunit i and Subunit j) has a smaller individual field of view (e.g., FOVi and FOVj), each of which is centered about an axis in a different direction. There is also a mechanical hinge (102) between some of the sub-units to enable self-assembly. FIG. 1B shows an unfolded flat state of the sensor (100) showing a position of one of the mechanical hinges (102) between two of the sub-units.

The structure of sub-units may be assembled on a support body (e.g., a rigid hollow support body, or a solid support body), for example, by bending a flat sensor design on the support body. This flat sensor design of the pre-assembled sub-units can be in the form of an arrangement of sub-units connected to each other. This arrangement can be manufactured using planar technology, where each sub-unit is formed on a different portion a substrate that is provided as a wafer of a substrate material. Such wafers may be produced out of glass, quartz, sapphire, for example, or out of semiconductor materials such as Silicon, Indium Phosphide, Gallium Arsenide, and others.

Each of the sub-units in the arrangement can be configured to function as an individual sensor element that is able to perform LiDAR imaging within its individual field of view. For this, different techniques, such as time-of-flight LiDAR, frequency modulated continuous wave LiDAR, two wavelength LiDAR, etc. may be applied. The sub-units can be configured to use focal plane arrays, aperture plane arrays, or can be configured to include mechanical scanning techniques based on MEMS.

In some implementations of the manufacturing process, steps are introduced at a given point in the process to produce mechanical connections between the sub-units. Such connections are configured to allow the sub-units to move angularly relative to each-other while keeping the distance across the connection substantially constant, effectively configuring a hinge between the two sub-units. Such hinges may be made out of materials that have enough elasticity/plasticity and are configured to allow such movement.

Alternatively, hinges may be made out of substantially rigid materials, but are configured to have a discontinuity between the parts so that they can move relative to each other, with the geometry of the parts constraining movement as to provide the desired hinge function. In order to manufacture such hinges, layers of flexible materials may be used, including polymer layers, inorganic dielectric layers, semiconductor or metal layers. Such layers may be then patterned using photolithography, electron-beam lithography, ion beam milling or other methods.

Figure 2A:
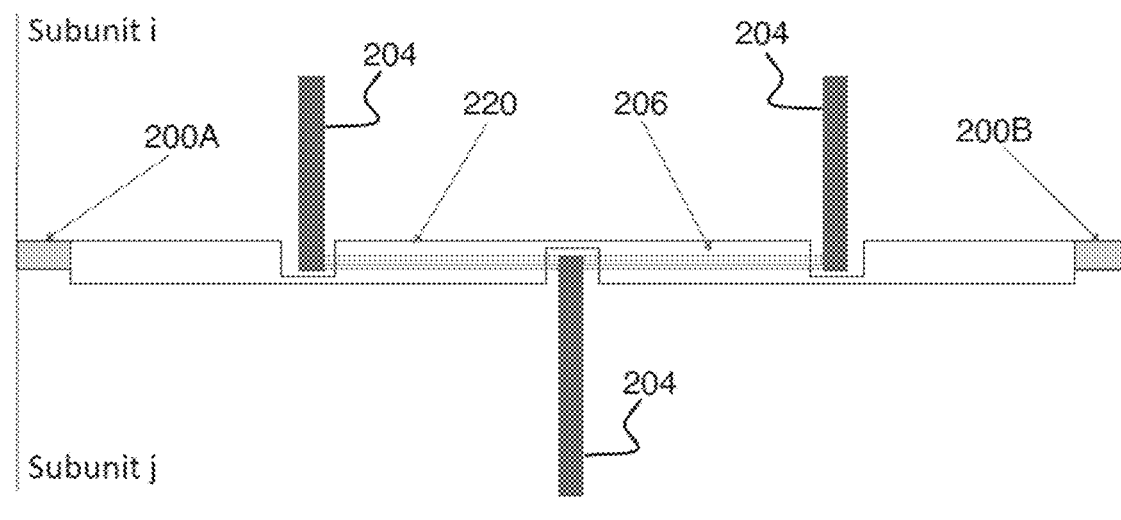
FIGS. 2A and 2B.—Show diagrams of example hinge assemblies.

In a particular implementation of a hinge assembly shown in FIG. 2A, a continuous strip of polymer connects two sub-units, Subunit i and Subunit j, at two points through two cantilevers (202A, 202B) clamped at two different locations in the two sub-units. The rigidity of the sub-units ensures that such cantilevers may only deform out of plane and provide the desired hinge functionality. The assembly also enables optical and/or electrical connections to be made between neighboring sub-units at one or more locations, as shown by the optical/electrical bus couplers (204) that connect to an optical/electrical bus (206) in proximity to the hinge.

Figure 2B:
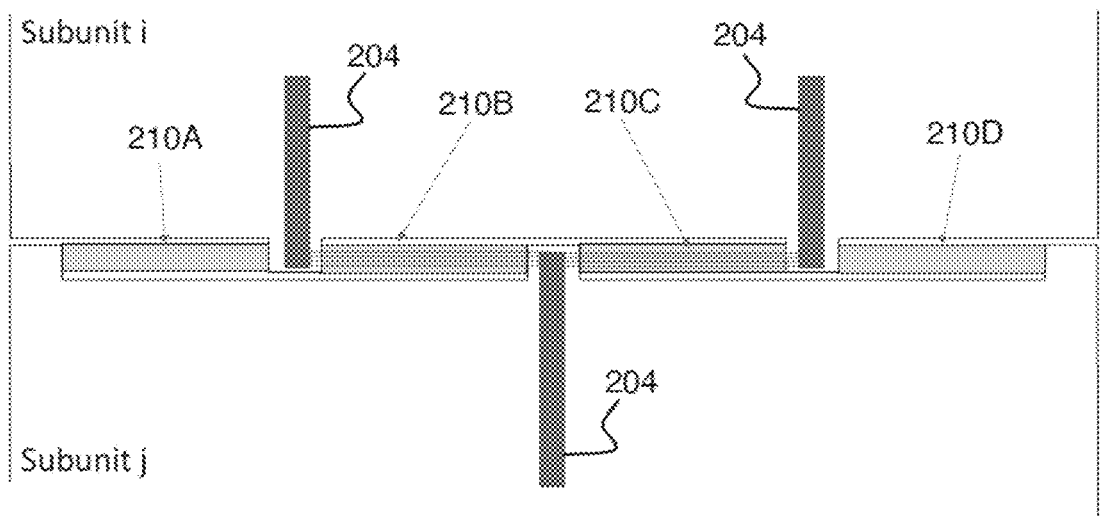

In another particular implementation of a hinge assembly shown in FIG. 2B, a layer of thin silicon is patterned so as to produce several beams (210A, 210B, 210C, 210D) that act as torsional hinges between two sub-units, subunit i and Subunit j. The configuration of the multiple torsional hinges along a common axis ensures that rotation is substantially constrained around that single axis.

At a given point in the manufacturing process, steps are included to produce the couplers (204) and the bus (206) that provide electrical and/or optical connections between the sub-units. Such connections will provide a time basis for the synchronization of the LiDAR receivers in each sub-unit with the emitter in order to be able to produce the desired ranging function. This synchronization can be obtained from a phase, frequency, or time reference in an optical or electrical signal.

For example, the flank of a pulse may be used to determine the start of a ranging period and the reference to measure distances in a Time of Flight setup. Alternatively, the optical frequency in a waveguide may serve as a reference to compute distance in a frequency-modulated continuous-wave (FMCW) scheme. In an alternative implementation, phase may serve as a reference to compute distance in a phase shift keying (PSK) coding scheme. Such electrical and/or optical connections may be additionally used to transfer imaging and ranging information from each sub-unit, or to power the individual sub-units.

The electrical connections can be provided by depositing one or more metallic or conductive layers on a bulk substrate and patterning them into individual conductors that form part of the couplers (204) and bus (206). Suitable materials include aluminum, gold, chromium, titanium, platinum, copper, or indium tin oxide, among others. The deposition of these layers may be done using sputtering, evaporation, or plating. The patterning of the layers may be done using photolithography, electron-beam lithography, ion beam milling, or otherwise.

The optical connections can be provided by depositing one or more transparent materials on a bulk substrate, such as dielectrics and semiconductors, and patterning them to define waveguides that form part of the couplers (204) and bus (206). Commonly used materials include silicon oxide, silicon nitride, silicon oxynitride, silicon, gallium arsenide, indium phosphide, siloxane-based polymers, halogenated acrylate polymers, fluorinated acrylate polymers, and other polymers. The creation of these layers may be done using epitaxial growth, doping, evaporation, chemical vapor deposition, sputtering, or otherwise. The patterning of the layers may be done using photolithography, electron-beam lithography, ion beam milling, or otherwise.

Given the mechanical movement that occurs during assembly, there will be stresses and forces that may be carefully managed to avoid breakage of the electrical conductors and/or optical waveguides. In particular, it may be advisable to introduce serpentine bends and other spring-like structures that can absorb deformation at low stress levels. Stress concentration points, such as those arising from the geometry or abrupt transitions between two regions with different material properties, may be avoided. Additionally, it is possible to create long free-standing sections (220) along the rotational axis of the hinge to distribute torsional stress (referring again to FIG. 2A).

At another point in the manufacturing process, measures will be introduced that singulate (or separate) these sub-units from the bulk of the substrate and from each other. Different technologies can be used for this, including DRIE, RIE, wet etching, laser cutting, dicing, and others. In some implementations, such a singulation is selective to the bulk of the substrate and allow the interconnections between the sub-units to be functional. A way to achieve this is to have a protective layer between the substrate being removed and the different functional layers. Another way is to use a process that is selective for the bulk of the substrate only. Another way is to use a timed process, so that the process stops before the functional layers start being affected.

The flat sensor design singulated from the bulk of the substrate may, for example, correspond to the polygonal network of a polyhedron. In some implementations, the network will have faces that define the sub-units and edges that create connection points between the sub-units. These edges will allow movement between the different sub-units so that the structure can be assembled in three dimensions. This relative rotation of two adjacent sub-units around an edge may be allowed using mechanical hinges, or linkages, or through the usage of flexible or plastic connections between the sub-units, as described above. In some implementations, the sub-units are connected electrically and/or optically across the hinges. This can be accomplished using waveguides and/or metal buses configured to go across the units, as described above.

One or more of the sub-units may include or be physically connected to additional electro-optical instrumentation that may extend into a portion of the substrate of a given sub-unit, which may act as a base for the given sub-unit or may be attached to an appropriately shaped material forming a base for the given sub-unit. These sub-units may contain additional electronics to amplify, digitize, serialize and/or otherwise multiplex the signals from the individual sensing sub-units. These components may be attached to the base, forming extended sub-units, and may have optical interfaces to an optical fiber, a light source, and/or external detectors, in order to allow the LiDAR scanning function of the individual sub-units. Alternatively, these components may be included monolithically in the base and/or included through hybrid integration of components.

Figure 3A:
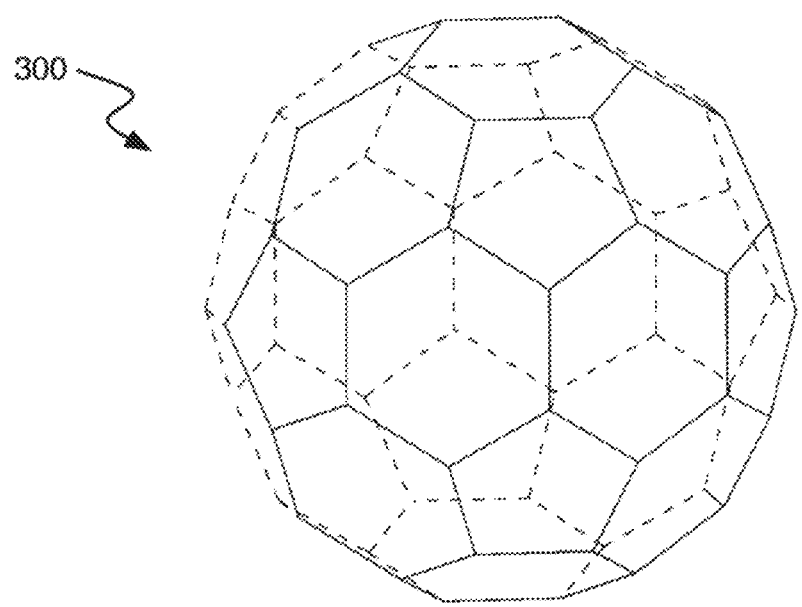
FIGS. 3A and 3B.—Show diagrams of a truncated icosahedron shaped sensor showing an assembled view and a flat unfolded view, respectively.
Figure 3B:
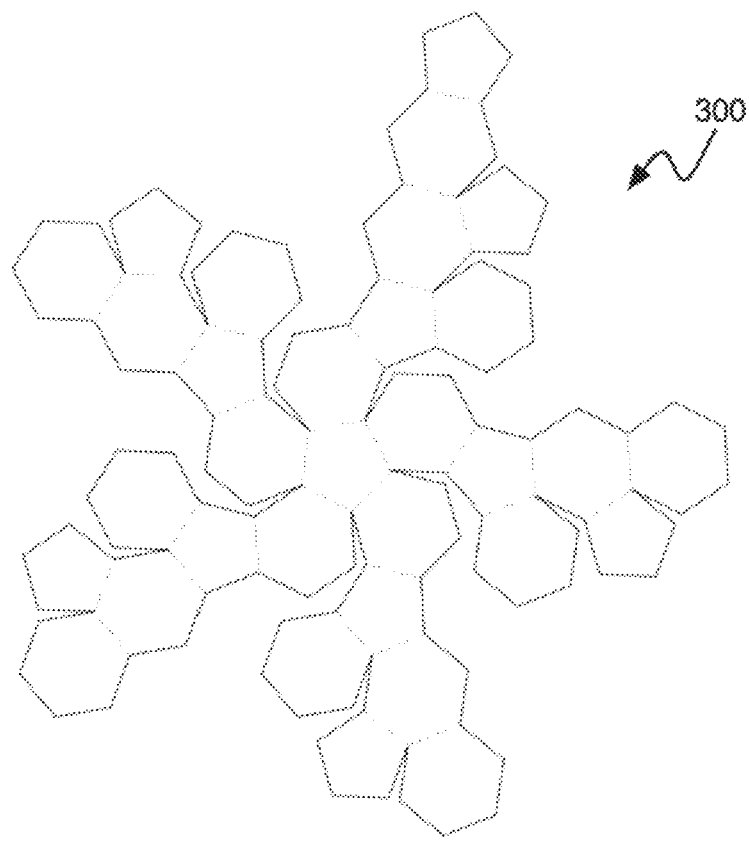

The polyhedron can be one of the Platonic Solids, i.e., a tetrahedron, a cube, an octahedron, a regular dodecahedron or a regular icosahedron. The advantage of a regular solid is that all dihedral angles between sub-units are equal, providing a uniformly spaced partition of the solid angle around the sensor. An irregular solid can also be used, such as a truncated icosahedron (or a pentakis dodecahedron), as shown in FIGS. 3A and 3B in assembled and unfolded states, respectively.

As the number of faces increases, a better approximation to the sphere can be obtained, and the dihedral angles between the faces become flatter and the partition of the solid angle in the desired composite field of view becomes finer, meaning that each sub-unit only needs to scan a smaller solid angle. A geodesic polyhedron, a UV approximation to the sphere, a Goldberg polyhedron or any other tessellation of the sphere with a sufficient polygon count can be used. These tessellations can be expanded into a flat net that can then be folded into a final desired 3D shape.

The tessellation can also correspond to a non-spherical shape or only a part of the sphere. For example, the tessellation can correspond to an ellipsoid, a cylinder, a cone, or a section of those. The choice of shape will depend on the distribution of sub-units that is desired and the composite Field of View that the system is trying to reproduce.

Additionally, the device may include actuation mechanisms that push two adjacent sub-units into an angle relative to each other. These actuation mechanisms can define the mechanical rotation and solely connect the sub-units mechanically, or can be supplemented by other mechanical elements, as described above. In an implementation, a layer with engineered stress levels will be used to produce an out-of-plane spring that is in equilibrium at or beyond the target angle for each sub-unit connection. Upon release of the device during or at the end of the manufacturing process, the springs will take the sub-units to their final positions, potentially guided by contact with the support body.

In some implementations, the actuation mechanism can be based on a two-material beam that exhibits a bending momentum when heated, and which induces a rotation around the hinge. The two materials in this layer may be chosen so that the difference in expansion coefficients results in a net curvature in the layer within a selected temperature range. The force of the actuators may be designed to counteract device mass and the stiffness of any potential mechanical hinge or support at the target position.

Device mass can be reduced by etching away part of the bulk substrate without affecting the optically functional layers of each of the sub-units. In particular, it may be possible to remove the bulk substrate altogether, except at the boundaries defining the different sub-units.

In some implementations, the actuation mechanism relies on the change of phase or state of a material. This phase change can be induced by a change of temperature or under illumination, for example, and the change of the material shape and or volume can result in a mechanical actuation effect. These actuators include paraffin-based actuators, shape memory alloys, photoinduced phase-transition polymers (e.g. polydiacetylene, as described in Ikehara et al., Sensors and Actuators A: Physical, Volume 96, Issues 2-3, 28 February 2002, Pages 239-243, incorporated herein by reference) or devices based on hydrogels. An advantage of these devices is the high forces that they can produce, which may reduce the need for mass reduction and substrate etching.

Other actuation techniques including MEMS-based techniques may be used, such as the deposition and patterning of ferromagnetic materials on the substrate (e.g. Nickel, Cobalt, Iron, etc.). This can be done through sputtering, evaporation, plating or a combination of those. The deposited layer would not be by default a permanent magnet. In this case, a permanent magnet in the support body can be used to produce the forces that result in the self-assembly of the structure. Alternatively, external magnetic fields generated by electro-magnets or permanent magnets may be applied to produce the desired forces. Without being bound by theory, examples of equations that can be used to compute various parameters include the following. The force on a ferromagnetic particle can be determined as:

$$\vec{F_m} = V\chi\nabla\left(\frac{1}{2}\vec{B}\cdot\vec{H}\right)$$

Where V is the volume, $\chi$ is the susceptibility of the particle and $\vec{B}$ and $\vec{H}$ are the magnetic induction and magnetic field intensity, respectively. The field of a sphere of permanent magnet is defined by that of a magnetic dipole outside of its volume:

$$\vec{B}(\vec{r}) = \frac{\mu_0}{4\pi}\left[\frac{3\hat{r}(\vec{m}\cdot\hat{r}) - \vec{m}}{r^3}\right]$$

Where $\vec{m}$ is the magnetic dipole moment. For a spherical permanent magnet with remanent field $\vec{B_r}$, the dipole moment is:

$$\vec{m} = \frac{4}{3}\pi R^3 \vec{B_r}$$

Figure 4:
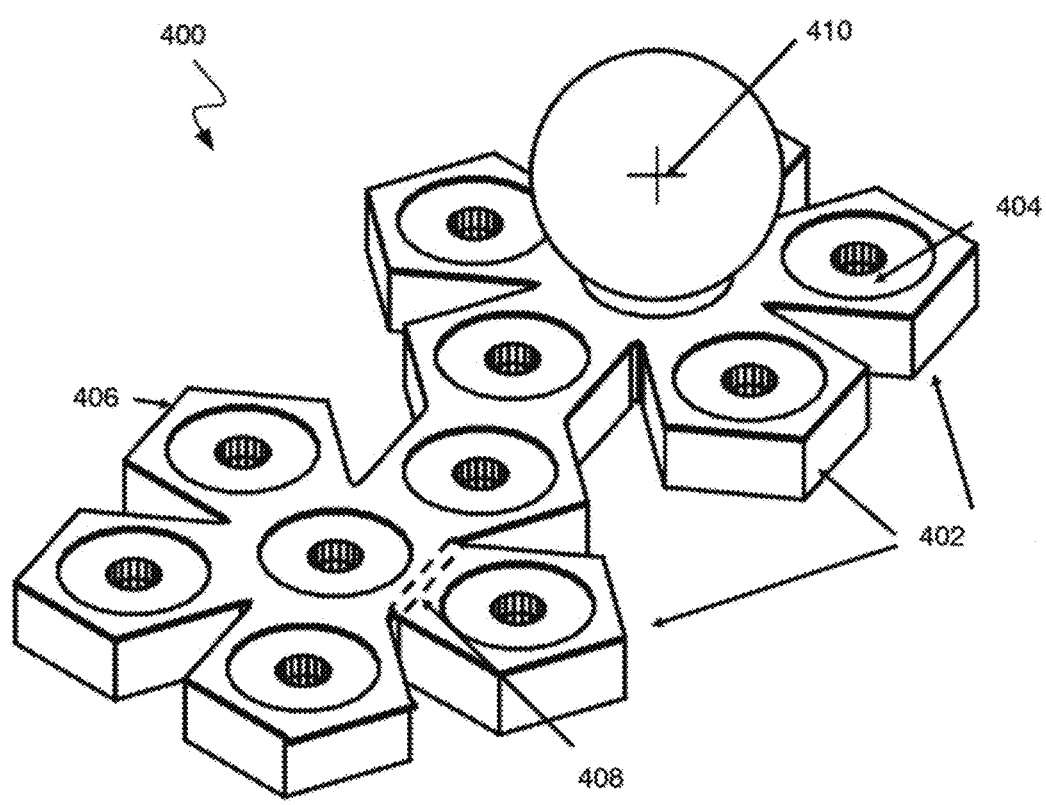
FIG. 4.—Shows a diagram of a dodecahedron-shaped sensor and magnetic components.
Figure 5B:
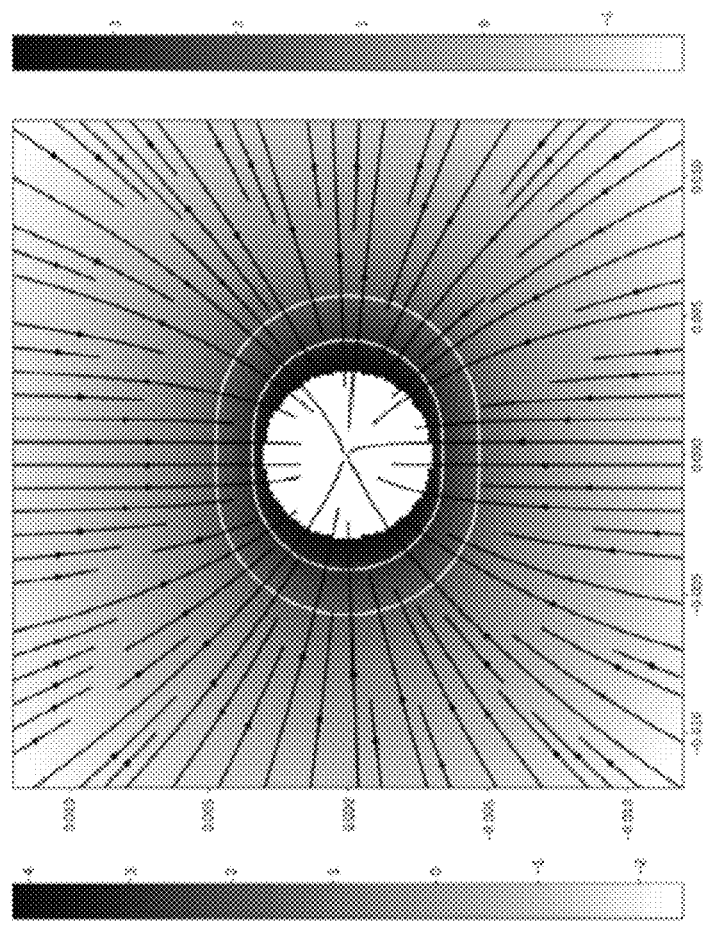
FIGS. 5A and 5B.—Show plots of example magnetic field patterns.
Figure 5A:
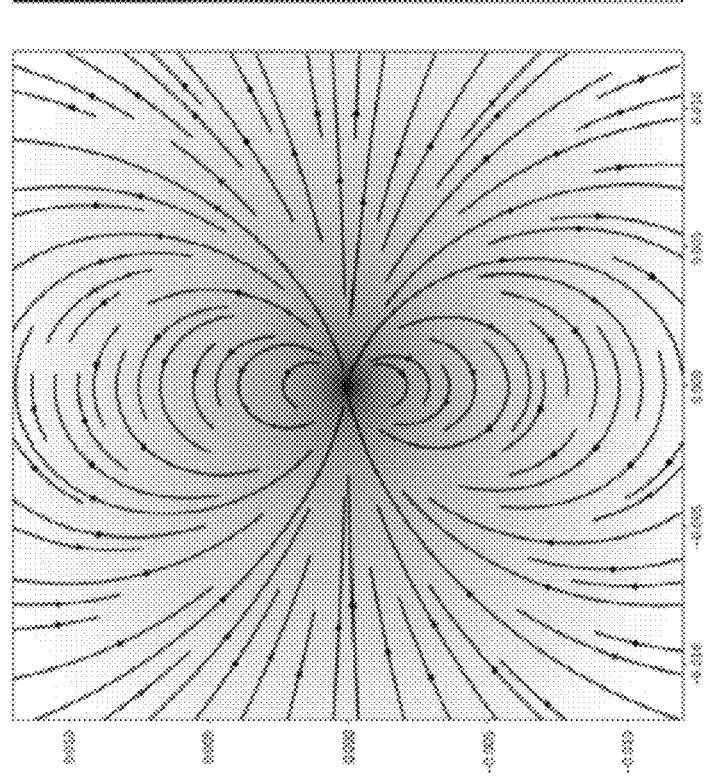

FIG. 4 shows an example of a dodecahedron-shaped sensor assembly (400) in an unfolded state, which includes sub-units (402) that include circular portions that are coated with ferro-magnetic material (404), a flexible foil material (406) over a surface of the sub-units, and hinge areas (408) formed between neighbouring sub-units. A neodymium ball magnet (410) is positioned on one of the sub-units. FIGS. 5A and 5B show exemplary magnetic fields and corresponding forces, respectively, for an assembly having the dipole moment of a magnetic permanent magnet (e.g., such as ball magnet (410)) with 3 mm diameter, and the forces on circular sub-units of 1.8 mm diameter coated with 0.5 μm of ferro-magnetic material (e.g., such as material (404)) with susceptibility $\chi$=20. The magnetic field pattern of FIG. 5A results from a dipole pointing in the horizontal direction with intensity shown on a log scale and with overlaid field lines. The force pattern of FIG. 5B resulting from the net force exerted by a spherical permanent magnet on the thin layer of 0.5 μm thickness, and 0.92 mm radius with intensity shown on a log scale and with overlaid field lines.

Alternatively, an external magnetic field may be applied and modulated in amplitude and direction to control the assembly operation. The ferromagnetic materials may be grown in an external field to induce permanent magnetization in their volume and support the assembly. As an alternative to ferromagnetic materials, micro-coils may be defined on the substrate so that they experience a Lorentz force and a torque. Thus, the external magnetic field can be used to create the desired forces on the sub-units to induce the self-assembly. Each micro-coil can be actuated independently or all of them simultaneously. The forces can result from the interaction with an external field either from a permanent magnet or an electro-magnet, a field generated by another micro-coil on the same substrate, or interaction with a ferromagnetic material that may be embedded in the substrate or in the support body.

Figure 6:
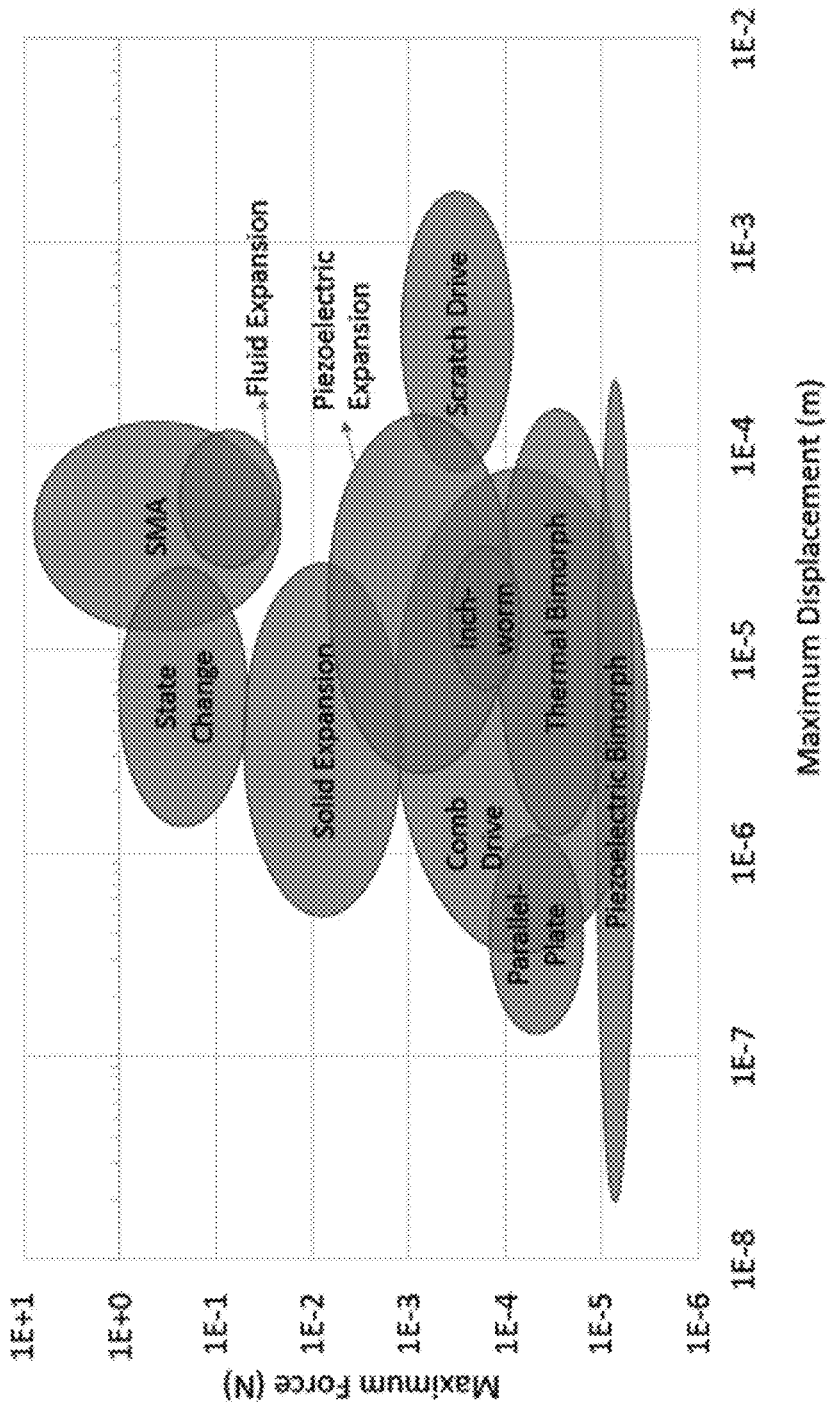
FIG. 6.—Shows a graph of examples of various effects and corresponding regions of maximum displacement vs. maximum force.

Other options, like electrostatic actuation, piezoelectric layers, etc., can be leveraged to the same effect. FIG. 6 shows examples of various effects that can be used to provide forces for self-assembly, and corresponding regions of maximum displacement vs. maximum force (graphed with log scales for each axis), which is based on a similar graph appearing in D. J. Bell et al. J. Michromech. Microeng. 15 S153, 2005, incorporated herein by reference.

The structure can be designed to include contact points between the sub-units such that they lock into place during the actuation process. In that case, there may be no need for a support body. This locking can be achieved through mechanical structures only, or can involve the use of a gluing, soldering or welding step.

Each of these sub-units may be coupled to a receiving module that collects light from the field of view corresponding to that sub-unit. The receiving modules may include components configured to discriminate the angular direction of the received light within the field of view. This can be achieved through an imaging sensor in the focal plane of a telescope lens. It can also be achieved through a phased array, through a single beam coming from a single waveguide coupled to lens and a MEMS scanner, or through an array of apertures with independent heterodyne mixing with a local oscillator, as described in U.S. Provisional Application Patent Ser. No. 62/839,114, filed Apr. 26, 2019, incorporated herein by reference, for example. The LiDAR system may also include one or more emitting module(s). These one or more emitting module(s) may be coupled to the sub-units (e.g., in a shared structure with the receiving modules), or may be independent from the sub-units.

Figure 7:
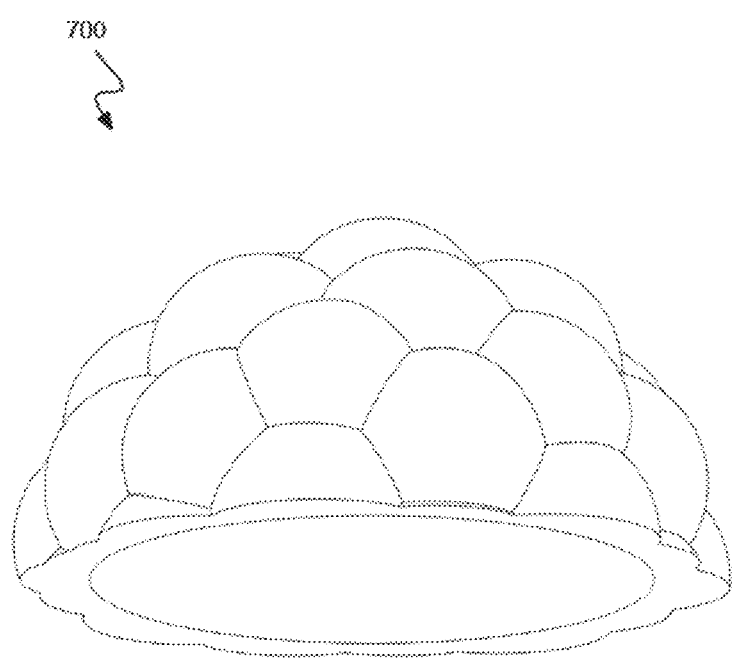
FIG. 7.—Shows a diagram of an example hemispherical shell with a lenslet array for focusing or FOV adjustment.

In the case of sub-units based on sensors designed as focal plane arrays, lenses may be used. Such lenses can be produced as shell sections with the individual lenslets protruding (or as inclusions) from the outer surfaces, as in the lenslet array (700) shown in FIG. 7, and/or inner surfaces. The shape (spherical or not), and lenslet distribution of that structure will reflect the internal sensor design. The self-assembled focal plane sensor may be mechanically assembled and aligned with the focusing structure. Lenses can also be used to adjust the field of view of aperture plane array designs, as described in the U.S. Patent Application Publication US2017/0350965A1, incorporated herein by reference. Such shapes may be produced using high precision 3D printing, molding, machining or through any other suitable technology.

The emitting module(s) will illuminate the composite field of view, in part or completely. In particular, a single emitting module is possible. Each emitting module may include a diffuser or a focusing lens that directs light into a given solid angle; it can also include a beam steering element that allows the system to direct light into a specific direction. This beam steering element can be based on mechanical actuation or a phased array, for example.

The emitting module(s) can be coordinated with the plurality of receiving modules in the different sub-units through electronic circuitry. The emitting module(s) may share physical space and focusing optics with the receiving modules, or they may be separate. The overlap between the illumination from the emitting module(s) and the angularly resolved information from the receiving modules results in the ability to scan the environment of the sensor in 3 dimensions.

The technical issues addressed by some of the techniques described herein include the generation of a LiDAR system with a large FOV, which can extend up to complete spherical coverage. Many previous LiDAR systems have significantly less than full spherical coverage. LiDAR systems with large angular coverage may also be relatively costly and bulky for many applications.

The described technical approaches address the potential issues by allowing low-cost fabrication of a LiDAR system with a wide compound field of view. This is possible in part due to the self-assembly features disclosed herein, coupled to monolithic fabrication of the combined multiple LiDAR sensor subsystems for each viewing direction.

Some systems extend the field of view through the rotation of a sensor arrangement. Alternatively, an individual assembly of multiple independent sensors on a single body could be used. These systems may require significantly more assembly effort, additional components, and/or may result in bulkier and more expensive devices.

One potential advantage of the techniques described herein is the simplicity of the assembly process, which allows a larger number of individual sensors to be used, with a more granular subdivision of the field of view. A sufficiently high-density sampling of space may reduce or remove the need for mechanical scanning, as long as there are no blind regions between the individual FOVs. Conversely, a larger coverage can be attained for a given limited field of view per individual sensor.

A polyhedral network may not have a 100% fill factor when fabricating the device on a substrate such as a wafer. This can generate a marginal increase in the fabrication cost of the sensor.

Additional processing steps may be needed to create connections between the sub-units and for singulation, typically once the rest of the device is manufactured. This may drive fabrication cost up. However, since this may be done in a batch manner, it may have a minor impact on total device cost and be vastly offset by the reduction of assembly time, materials and process complexity.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

The invention claimed is:

1. A method for providing a self-assembled extended field of view receiver for a LIDAR system, the method comprising:
   fabricating a plurality of sub-units on a planar substrate, where each sub-unit comprises:
      an optical sensing structure configured to receive at least a portion of an optical wavefront that impinges on one or more of the sub-units, and
      material forming at least a portion of a hinge in a vicinity of a border with at least one adjacent sub-unit;
   removing at least a portion of the substrate on respective borders between each of at least three different pairs of sub-units to enable relative movement between the sub-units in each pair constrained by one of the hinges formed from the material; and
   providing one or more actuators configured to apply a force to fold a connected network of multiple sub-units into a non-planar formation.

2. The method of claim 1, wherein one or more of the actuators is configured to apply a magnetic force.

3. The method of claim 2, wherein one or more of the actuators configured to apply a magnetic force comprises a ferromagnetic material.

4. The method of claim 2, wherein one or more of the actuators configured to apply a magnetic force comprises a planar coil formed on a surface of a sub-unit.

5. The method of claim 1, wherein the removing comprises removing at least a portion of the substrate on a border between each of at least eleven different pairs of sub-units.

6. The method of claim 1, further comprising fabricating at least one layer over the planar substrate that includes conducting material to provide electrical communication between at least one pair of adjacent sub-units.

7. The method of claim 1, further comprising fabricating at least one layer over the planar substrate that includes an optical waveguide to provide optical communication between at least one pair of adjacent sub-units.

8. The method of claim 1, further comprising attaching the sub-units to each other after the actuators fold the connected network of multiple sub-units into the non-planar formation.

9. The method of claim 1, further comprising placing a solid support body in proximity to at least one of the sub-units to confine movement of at least one of the multiple sub units and to at least partially determine a geometry of the non-planar formation.

10. The method of claim 9, wherein the solid support body has a remanent magnetization and interacts with the sub-units through its magnetic field.

11. The method of claim 9, further comprising attaching the sub-units (402) to the solid support body.

12. A device comprising:
   a plurality of sub-units fabricated on a planar substrate, where each sub-unit comprises:
      an optical sensing structure configured to receive at least a portion of an optical wavefront that impinges on one or more of the sub-units, and
      material forming at least a portion of a hinge in a vicinity of a border with at least one adjacent sub-unit;
   at least one gap along respective borders between each of at least three different pairs of sub-units to enable relative movement between the sub-units in each pair constrained by one of the hinges formed from the material; and
   one or more actuators configured to apply a force to fold a connected network of multiple sub-units into a non-planar formation.

13. The device of claim 12, further comprising at least one emitting module configured to provide an illumination optical wave illuminating at least a portion of a field of view.

14. The device of claim 13, further comprising circuitry configured to determine distances associated with one or more portions of the field of view based on outputs of the optical sensing structures.

15. The device of claim 14, where the non-planar formation is designed to combine the field of view of the optical sensing structures into an uninterrupted compound field of view.

16. The device of claim 14, where at least one optical waveguide connecting the sub-units is used to provide a time, frequency or phase reference to enable distance determination.

17. The device of claim 14, where at least one electrical conductor connecting the sub-units is used to provide a time, frequency or phase reference to enable distance determination.

* * * * *